April 26, 1938.  E. F. RIESING  2,115,672
RESILIENT SUPPORT
Filed Oct. 12, 1935    2 Sheets-Sheet 1
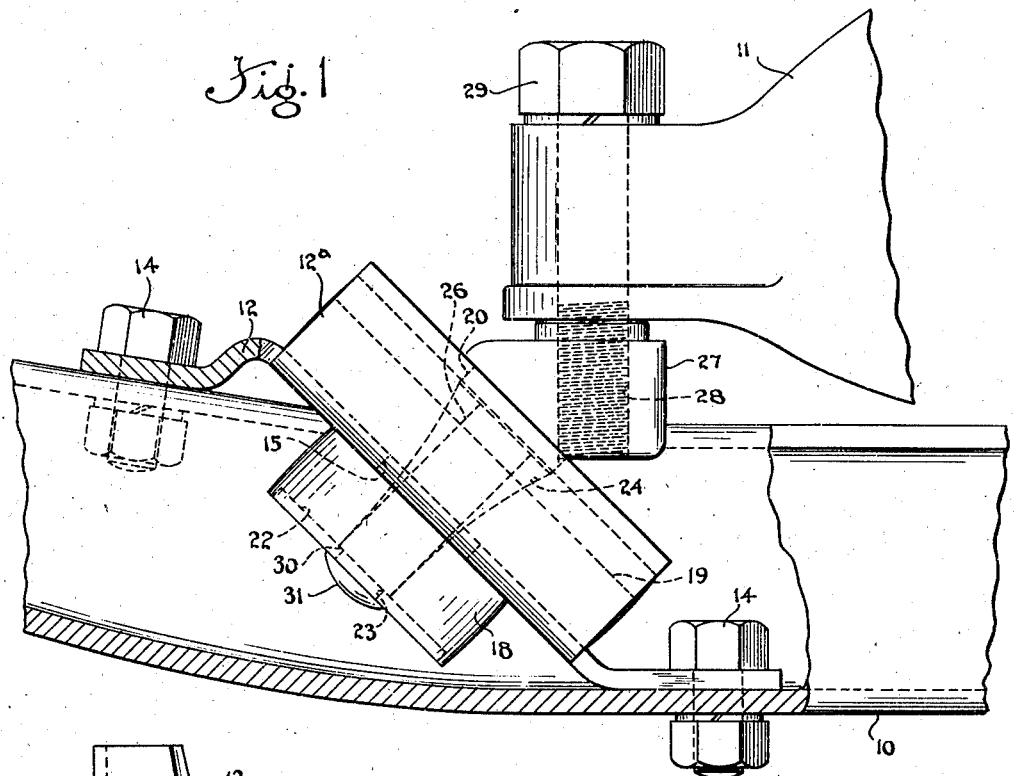
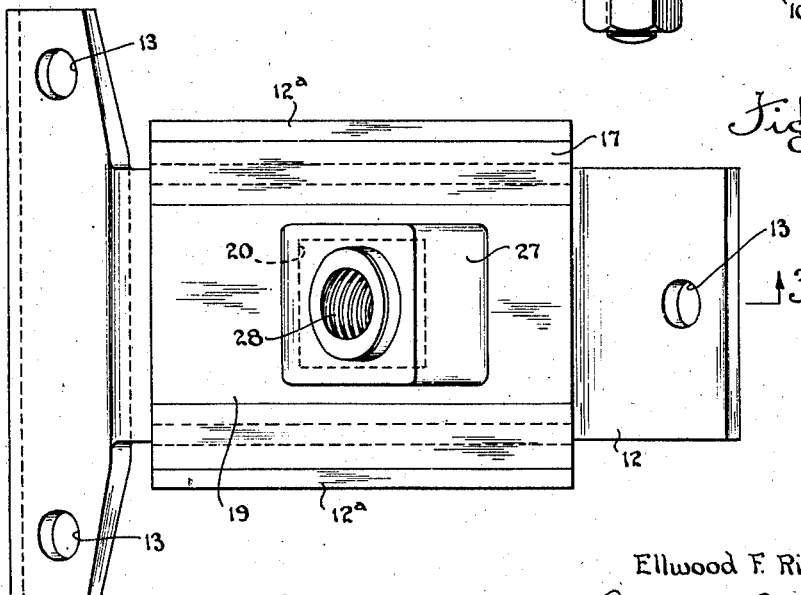
INVENTOR
Ellwood F. Riesing
BY
Albert L. Ely
ATTORNEY April 26, 1938.　　　E. F. RIESING　　　2,115,672
RESILIENT SUPPORT
Filed Oct. 12, 1935　　　2 Sheets-Sheet 2

INVENTOR
Ellwood F. Riesing
BY Albert L. Ely
ATTORNEY

Patented Apr. 26, 1938

2,115,672

UNITED STATES PATENT OFFICE 2,115,672

RESILIENT SUPPORT

Ellwood F. Riesing, Akron, Ohio, assignor to The Firestone Tire & Rubber Company, Akron, Ohio, a corporation of Ohio Application October 12, 1935, Serial No. 44,713

5 Claims. (Cl. 248—9)

This invention relates to resilient supports, and more especially it relates to resilient supporting structures such as may be used between a vibratory and a non-vibratory body to prevent the translation of vibrations to the latter. Resilient supports of the character mentioned commonly are used for supporting the motor or engine of a motor vehicle upon the frame of the vehicle, such an installation being depicted herein as an illustrative example of an embodiment of the invention.

The chief objects of the invention are to provide an improved resilient support capable of yieldingly opposing the bound and rebound of a vibratory body; to provide such a support which will have longer life than structures previously provided for the same purpose; and to provide greater stability for the vibratory body. A more specific object is to provide a resilient support comprising a deformable member, the latter being so constructed as to have relatively low flow during deformation. Other objects will be manifest.

Of the accompanying drawings:

Figure 1 is a side elevation of a resilient support embodying the invention in its preferred form, and a vibratory and a non-vibratory body operatively connected therewith;

Figure 2 is a plan view of the resilient support shown in Figure 1;

Figure 3:
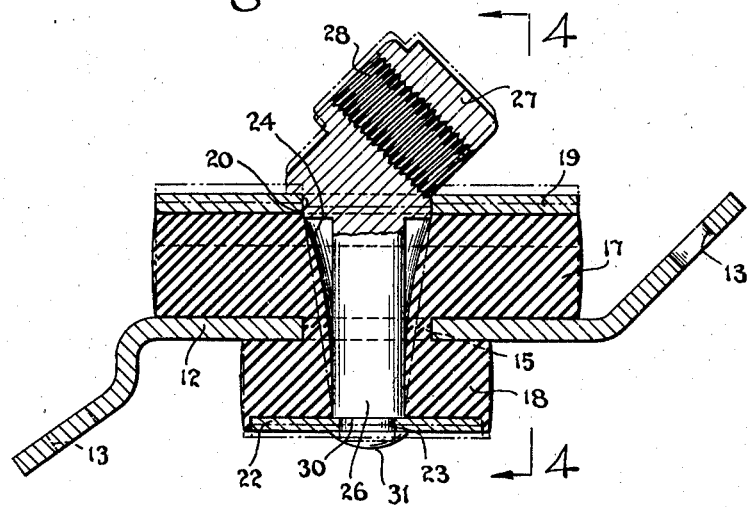
Figure 3 is a section on the line 3—3 of Figure 2.
Figure 4:
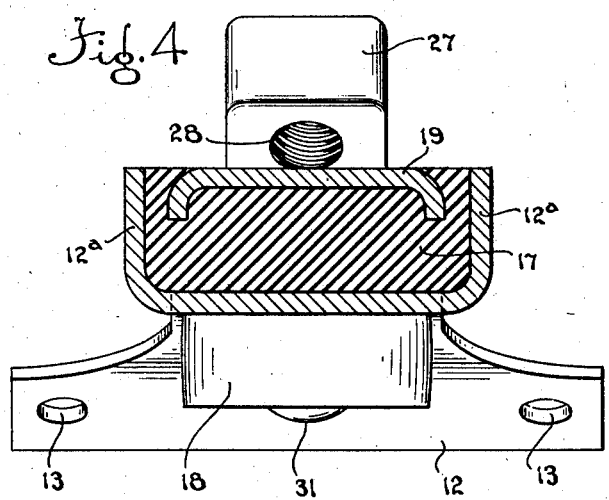
Figure 4 is a section on the line 4—4 of Figure 3.

Referring to the drawings, 10 is a portion of one of the transverse channel members of the frame of a motor vehicle, and 11 is a portion of the gear casing of the motor of said vehicle, said frame member and gear casing constituting the non-vibratory and the vibratory bodies respectively, with which the improved resilient support is associated.

The said resilient support comprises an elongate metal plate 12, the end portions of which are bent at an angle to the medial portion thereof and provided with bolt holes 13, 13 to receive bolts 14, 14 by which the said plate is secured to the channel member 10 of the vehicle frame. The medial portion of the plate 12 is formed with lateral marginal portions 12a, 12a that are bent at right angles to the plane of said medial portion, and extend upwardly when the support is mounted in operative position. A relatively large aperture 15, Figure 3, is formed centrally in the medial portion of the plate 12.

Vulcanized to the medial portion of the plate 12 is a resilient cushion of vulcanized rubber composition, said cushion consisting of a unitary structure comprising a portion 17 that is disposed upon the top face of the plate, filling the space between the marginal portions 12a thereof, and a portion 18 disposed on the bottom face of the plate, said portions being united to each other through the aperture 15. The portion 18 of the resilient cushion is of cylindrical shape and is co-axially arranged with relation to said aperture 15. The top face of portion 17 of the cushion is flush with the upper margins of flanges 12a, and its end faces are flush with the respective end-margins of said flanges.

Inset in the top face of cushion structure 17 is a shallow, inverted, metal channel 19 that extends from end to end of said cushion structure and has its respective lateral marginal portions spaced inwardly from the flanges 12a. The top face of the channel 19 preferably is flush with the top of the cushion as shown. The channel 19 is centrally formed with a square aperture 20 that is co-axially arranged with relation to the aperture 15 of plate 12.

Inset in the bottom face of cushion structure 18 is a metal plate or washer 22 that has its exposed face flush with the bottom face of said cushion structure. The washer 22 has the usual axial aperture 23, and the latter is co-axially arranged with relation to the aperture 15 of plate 12. Interiorly the rubber cushion is formed with a symmetrical, uniformly tapered recess 24 that extends from the channel 19, through aperture 15 in plate 12, to washer 22. The recess 24 is square at its upper end where it adjoins the aperture 20 of channel 19 and may be square throughout its length, or it may merge gradually to circular section, as shown, where it adjoins washer 22. In either event the small end of the recess is slightly larger than the aperture 23 in said washer.

The rubber and metal parts of the resilient support hereinbefore described are vulcanized together to form an integral structure, the original contour of which is indicated by the broken lines of Figure 3.

For connecting the resilient support to the gear case 11, a cylindrical stud 26 is provided, which stud is formed with a head 27 that has a threaded aperture 28 therein, the latter receiving a capscrew 29 by which said gear case is secured to the stud. The stud 26 extends through the resilient support by way of the apertures 20, 23 and recess 24 formed therein, there being a square shoulder formed on the stud at the juncture of the head 27 therewith, which shoulder is received in the aperture 20, the arrangement being such as to prevent angular movement of the stud relatively of the other portions of the support. The end portion of the stud 26 opposite head 27 is reduced in diameter so as to extend through aperture 23 in washer 22, and to form a shoulder 30 on the stud, which shoulder abuts the rear face of said washer. The reduced end portion of the stud 26 is upset or riveted over the outer face of washer 22, as shown at 31, with the result that the stud is permanently united with the other parts of the structure. The washer 22 is larger than the aperture 15 in plate 12, thus providing a mechanical interlock that prevents separation of said plate from the stud 26 even in the event of complete disintegration of the rubber cushion.

The length of stud 26 between the head 27 and shoulder 30 is somewhat less than the distance between the upper surface of channel 19 and the inner face of washer 22 so that in the assembling of the parts as described it is necessary to deform the resilient cushion by compressing the same axially of the stud in order to cause the washer 22 to bear against the shoulder 30 of the stud. The resilient cushion is permanently retained in such deformed condition by the stud.

The result of the deforming of the resilient cushion of the device is most clearly shown in Figure 3 wherein it will be seen that the cushion portion 18 is bulged slightly outwardly, and the cushion portion 17 is bulged inwardly into the recess 24 in the portion thereof not occupied by the stud 26. However, the initial deforming of the cushion 17 does not completely eliminate the recess 24, sufficient of the latter remaining to permit additional flow of the rubber thereinto when the cushion is further compressed during use.

In the installation of the resilient support herein illustrated, the support preferably is mounted in the oblique position shown wherein it is capable of absorbing vertical and lateral vibration of the motor with equal facility, as well as yieldingly opposing torsional and axial vibrations of the motor. Vertical and lateral vibrations of the motor are transmitted to the stud 26 substantially axially thereof, the impact of the vibrations being taken by the cushion structure 17 and the rebound being taken by cushion structure 18. Since the said cushion structures normally are under compression, such impact and rebound serve only to subject them to additional compressive force, the normal compression being sufficient to prevent either cushion structure from being placed under tension as the other is compressed. This feature of the invention makes for longer life of the structure. Moreover, the fact that the resilient support is under compression makes for greater stability of the supported body.

The feature of providing a central recess 24 in the cushion structure further prolongs the life of the latter since it constitutes a void into which the surrounding rubber of the cushions may flow during the compression phase of operation, thus resulting in low flow of the deformed and displaced rubber. Without this recess all the displaced rubber would require to flow toward the margins of the confining metal members, and this would set up excessive strains in the rubber and generate internal heat, with resulting detrimental effect upon the cushions.

Modification may be resorted to without departing from the spirit of the invention or the scope of the appended claims.

What is claimed is:

1. In a resilient support, the combination of an elongate plate attachable to a supporting structure, said plate having its medial region formed with an aperture and upstanding lateral flanges, a resilient rubber cushion vulcanized to opposite faces of the medial portion of the plate and extending from one lateral flange to the other and through the aperture therein, an inverted channel vulcanized into the cushion structure between said flanges, flush with the surface thereof, said channel being formed with an aperture co-axial with the aperture in said plate, a washer vulcanized to the surface of the cushion structure on the opposite side of the plate, co-axially with relation to the aperture in the latter, said cushion being formed with a recess extending from the aperture in the channel to the aperture in the washer, and a stud mounted in said recess and connected to said washer, said stud being attachable to a supported structure.

2. A combination as defined in claim 1, in which the recess in the cushion is substantially larger than the diameter of the stud to permit flow of the rubber into the recess upon compression of the cushion.

3. A combination as defined in claim 1, in which the aperture in the channel is non-circular in shape, including a complementally shaped shoulder on the stud engageable in said recess so as to prevent angular movement of the stud.

4. A combination as defined in claim 1 in which the stud is permanently connected to the washer, and is of such length as normally to retain the cushion under compression.

5. In a resilient support, the combination of parallel, spaced apart, upper and lower metal plates, a cushion of rubber between said plates and vulcanized to each of them, an intermediate plate extending through said rubber cushion and vulcanized thereto, opposite end portions of said intermediate plate projecting beyond said cushion and being angularly disposed for attachment to a horizontal structure so that the resilient support is disposed obliquely with respect to the horizontal and vertical, and a bolt passing freely through the intermediate plate and resilient cushion and engaging the upper and lower plates, said bolt being formed at its upper end with an angularly disposed head for attachment to a supported structure.

ELLWOOD F. RIESING.